(12) United States Patent
Bhojwani et al.

(10) Patent No.: US 11,645,300 B2
(45) Date of Patent: May 9, 2023

(54) NORMALIZATION OF UNSTRUCTURED CATALOG DATA

(71) Applicant: SAP SE, Walldorf (DE)

(72) Inventors: Sudhir Bhojwani, Mountain View, CA (US); Sudha Lakshman, Sunnyvale, CA (US); Quan Zhang, San Jose, CA (US); Sandeep Chakravarty, San Francisco, CA (US); Tu Truong, San Jose, CA (US); Fuming Wu, Palo Alto, CA (US); Yue Li, Palo Alto, CA (US); Lin Dong, Palo Alto, CA (US); Richa Namballa, Palo Alto, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/452,801

(22) Filed: Oct. 29, 2021

(65) Prior Publication Data

US 2022/0050854 A1    Feb. 17, 2022

Related U.S. Application Data

(63) Continuation of application No. 16/129,996, filed on Sep. 13, 2018, now Pat. No. 11,194,832.

(51) Int. Cl.
*G06F 16/00* (2019.01)
*G06F 16/25* (2019.01)
(Continued)

(52) U.S. Cl.
CPC ........ *G06F 16/258* (2019.01); *G06F 16/2272* (2019.01); *G06F 16/2455* (2019.01);
(Continued)

(58) Field of Classification Search
None
See application file for complete search history.

(56) References Cited

U.S. PATENT DOCUMENTS 6,473,898 B1 * 10/2002 Waugh .................... G06F 16/20
                                                        707/E17.108
6,675,294 B1 *  1/2004 Gupta .................... G06F 30/00
                                                              713/1

(Continued)

OTHER PUBLICATIONS

892 Form dated Jun. 11, 2020 which was issued in the parent U.S. Appl. No. 16/129,996.

(Continued)

*Primary Examiner* — Jean M Corrielus
(74) *Attorney, Agent, or Firm* — Buckley, Maschoff & Talwalkar LLC

(57) ABSTRACT

Provided is a method and system for normalizing catalog item data to create higher quality search results. In one example, the method may include receiving a record comprising an unstructured description of an object, identifying a type of the object from among a plurality of object types and identifying a predefined attribute of the identified type of object, extracting a value from the unstructured description corresponding to the predefined attribute and modifying the extracted value to generate a normalized attribute value, and storing a structured record of the object in a structured format comprising a plurality of values of a plurality of attributes of the object from the unstructured description including the normalized attribute value for the predefined attribute of the object.

20 Claims, 10 Drawing Sheets

(51) Int. Cl.
*G06F 16/28* (2019.01)
*G06F 16/22* (2019.01)
*G06F 16/2455* (2019.01)
*G06F 16/33* (2019.01)
*G06F 40/10* (2020.01)

(52) U.S. Cl.
CPC ........ *G06F 16/288* (2019.01); *G06F 16/3335* (2019.01); *G06F 40/10* (2020.01)

(56) References Cited

U.S. PATENT DOCUMENTS

| | | | | |
|---|---|---|---|---|
| 6,728,706 | B2* | 4/2004 | Aggarwal | G06Q 30/02 |
| | | | | 707/999.005 |
| 6,944,612 | B2 | 9/2005 | Roustant et al. | |
| 8,775,433 | B2 | 7/2014 | Green et al. | |
| 9,384,233 | B2 | 7/2016 | Fuxman et al. | |
| 9,418,371 | B2 | 8/2016 | Hansen et al. | |
| 9,558,186 | B2 | 1/2017 | Betz et al. | |
| 9,606,970 | B2 | 3/2017 | Pappas et al. | |
| 9,892,208 | B2 | 2/2018 | Anastasakos et al. | |
| 10,163,144 | B1 | 12/2018 | Wu et al. | |
| 10,233,406 | B2 | 3/2019 | Araujo Barreto et al. | |
| 10,235,449 | B1 | 3/2019 | Viswanathan et al. | |
| 10,304,134 | B2 | 5/2019 | Burns et al. | |
| 10,558,673 | B2* | 2/2020 | Lee | H04L 51/52 |
| 10,558,693 | B1* | 2/2020 | Elieson | G06Q 30/0623 |
| 2003/0084379 | A1* | 5/2003 | Bingham, Jr. | G06N 5/00 |
| | | | | 714/38.11 |
| 2004/0117290 | A1* | 6/2004 | Shacham | G06Q 30/02 |
| | | | | 705/37 |
| 2005/0102199 | A1* | 5/2005 | Lee | G06Q 30/06 |
| | | | | 705/26.5 |
| 2007/0260520 | A1 | 11/2007 | Jha et al. | |
| 2011/0093467 | A1* | 4/2011 | Sharp | G06F 16/2228 |
| | | | | 707/E17.069 |
| 2011/0264598 | A1 | 10/2011 | Fuxman et al. | |
| 2012/0284144 | A1* | 11/2012 | Herbst | G06Q 50/08 |
| | | | | 705/26.5 |
| 2013/0091159 | A1 | 4/2013 | Fuxman et al. | |
| 2013/0191723 | A1 | 7/2013 | Pappas et al. | |
| 2014/0052736 | A1* | 2/2014 | Anderson | G06F 16/258 |
| | | | | 707/E17.014 |
| 2014/0052744 | A1* | 2/2014 | Anderson | G06F 16/289 |
| | | | | 707/756 |
| 2014/0358931 | A1* | 12/2014 | Garera | G06F 16/258 |
| | | | | 707/740 |
| 2015/0278839 | A1 | 10/2015 | Hansen | |
| 2015/0378975 | A1 | 12/2015 | Wu et al. | |
| 2018/0365707 | A1 | 12/2018 | Jha et al. | |
| 2019/0311301 | A1 | 10/2019 | Pyati | |

OTHER PUBLICATIONS

892 Form dated Nov. 2, 2020 which was issued in the parent U.S. Appl. No. 16/129,996.

892 Form dated Feb. 19, 2021 which was issued in the parent U.S. Appl. No. 16/129,996.

892 Form dated Aug. 9, 2021 which was issued in the parent U.S. Appl. No. 16/129,996.

Notice of Allowance dated Aug. 9, 2021 which was issued in the parent U.S. Appl. No. 16/129,996.

* cited by examiner

NORMALIZATION OF UNSTRUCTURED CATALOG DATA

CROSS-REFERENCE TO RELATED APPLICATION(S)

This application is a continuation of U.S. patent application Ser. No. 16/129,996, filed on Sep. 13, 2018, in the United States Patent and Trademark Office, the entire disclosure of which is incorporated herein for all purposes.

BACKGROUND

Suppliers often organize products (e.g., goods and services, etc.) into catalogs due to seasonal changes in products, different product lines, and the like. An electronic catalog is an online publication which may be implemented with a graphic interface where goods and services can be browsed. Electronic catalogs can store large quantities of products, which can be organized and classified into different categories enabling users to search in a faster and more effective way, making electronic catalogs a more desirable option over printed catalogs. Catalog items can include various features but typically include at least a price, a product description, and images of the product (especially in the case of goods).

A supplier may provide their electronic catalog to an integrated platform where catalogs of multiple suppliers may be consolidated. Users can browse through catalog items via an online marketplace including a search engine hosted via the platform. The search engine may query product descriptions of catalog items based on user input to identify search results. Often, suppliers have overlapping product lines giving consumers more purchase options (and more search results) for the same product. However, product descriptions are often supplier-specific. As a result, the product data being searched by the search engine is highly de-normalized. For example, a first supplier may refer to an item as a "tablet" while a second supplier may refer to the same item as a "portable personal computer." As a result, the search engine often fails to identify products that match the user input because of the differences between the user input and the product description. Accordingly, an improved search mechanism is needed for de-normalized catalog data.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 4A-1, 4A-2, and 4A-3 are diagrams illustrating a process of normalizing and indexing a plurality of catalog records, in accordance with an example embodiment.

Figure 1:
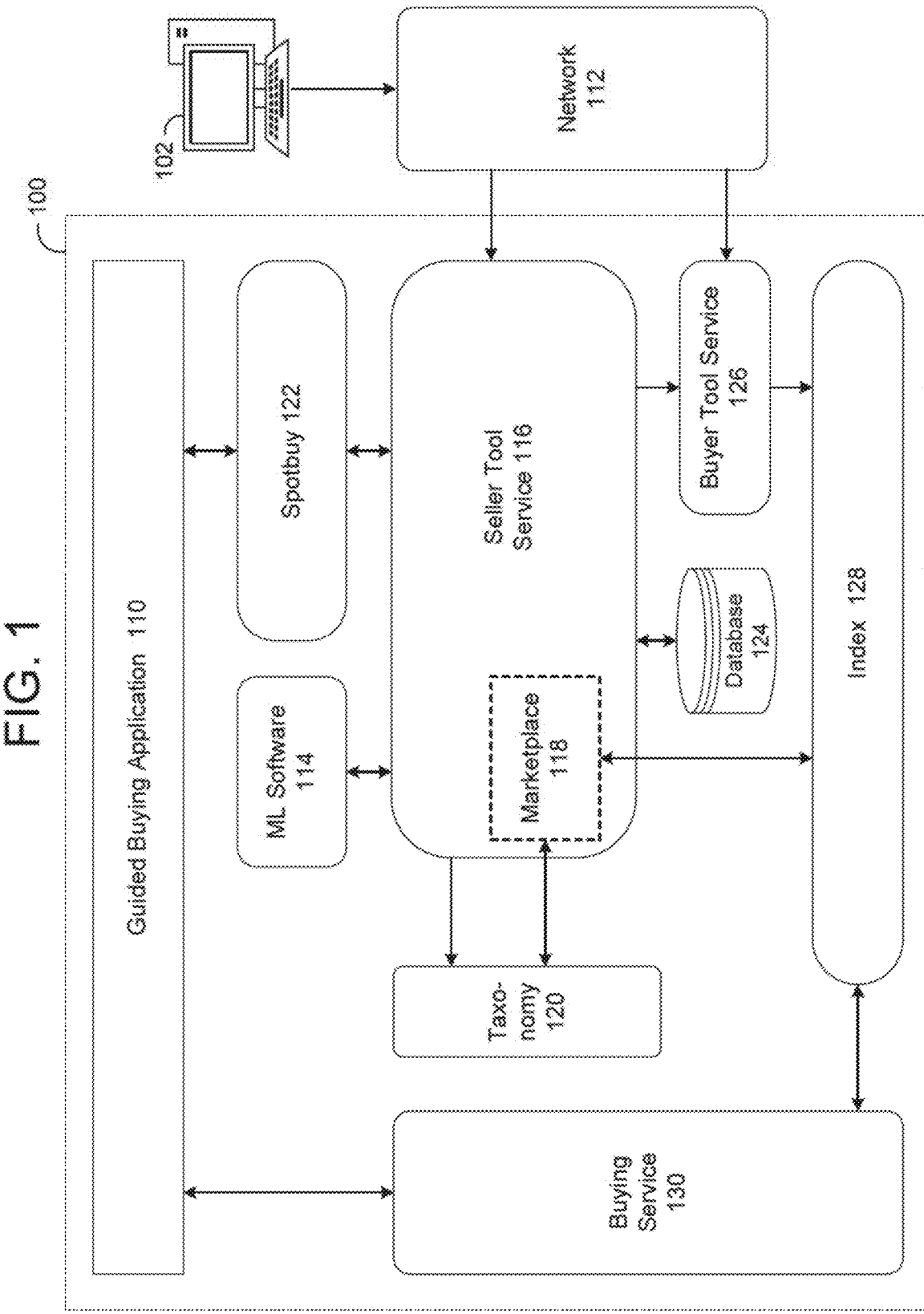
FIG. 1 is a diagram illustrating a catalog search system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

When providing catalog data to an online marketplace or other aggregator, suppliers may upload static content that typically includes general features of a product (also referred to as a an item, an object, etc.). For example, a catalog entry may include a product description which describes the features of the product, a price, a product name, a product ID, a brand, and the like. Different suppliers may describe their products differently. In other words, there is no universal product description for catalog entries. As a result, different text, words, phrases, descriptions, numbers, abbreviations, and the like, may be used by different suppliers when describing the same product and/or product attributes. Furthermore, most products have distinct attributes making a general normalization process of product information for all products a difficult task.

The example embodiments improve upon how catalog data is stored and searched such as through an online marketplace. Catalog items typically include strings of text (e.g., unstructured, partially structured, etc.) with details and other descriptions of the product therein. The unstructured text may be referred to as a product description or product details. According to various aspects, the system herein can identify a plurality of predefined attributes for a particular product type and extract values for those attributes from the product description using one or more machine learning algorithms. Each type of product (or object) may have its own respective attributes which can be identified by the algorithm(s) from the unstructured text. Some of the attributes may be universal across most products such as color, brand name, size, etc., while some attributes are specific to a type of product (e.g., screen size, operating system type, processor type, etc.) The system herein may rely on various types of machine learning algorithms including a group of universal attribute identifiers which each look for a specific attribute (color, etc.) and product-specific attributes which look for particular attributes related to a product.

After identifying attribute values of a product from a product description included in a catalog entry, the system may convert the identified values into normalized values, if they are not already in the normalized format. The system may perform the process for all suppliers regardless of initial attribute format thereby creating a single normalized structure of attributes for all catalog entries of a certain product. For example, normalizing of an attribute value may change a wording or a format of the value. For example, the value "operating system" may be converted into "OS". As another example, the value "BLK" may be converted into "black." As will be appreciated, there are many possible normalizations that can be performed for each type of attribute value. The normalized format may create a more generic description of the value. As another example, the system may infer or otherwise enhance a catalog record by inferring or otherwise implying an attribute that is not specifically listed within the product description but that is mentioned somewhere in the other areas of the catalog item such as the title, the description, or the like.

The process may convert an unstructured product description of a catalog record into a structured format of attributes which may include one or more normalized attribute values. The structured catalog data may be stored together with other structured data of other catalog records in a database. For example, the structured catalog data may be organized into an index which can be searched efficiently by a search engine. As another example, the structured catalog data may be displayed via a user interface in a format that is easier to understand for the user. The system can use high-quality attribute values identified from product descriptions uploaded by suppliers and normalize the high-quality attribute values into a format that can be commonly searched for all suppliers. When a user performs a search query for a specific attribute, term, etc., more high-quality search results may be provided as a result of the normalization.

FIG. 1 illustrates a catalog search system architecture 100 in accordance with an example embodiment. For example, the architecture 100 may be included in a host platform such as a cloud environment, a web server, a database, and the like. In some embodiments, the architecture may be distributed across multiple computing systems. Referring to FIG. 1, the architecture 100 includes a user device 102 for uploading catalog data via network 112, a guided buying application 110, machine learning software 114, a seller tool 116, an online marketplace 118, a taxonomy 120, a spotbuy service 122, a database 124, a buyer tool 126, an index 128, and a buying service 130. The example architecture of FIG. 1 is not meant to limit the type of architecture that performs the example embodiments and is shown here as one example of an architecture. Therefore, it should be appreciated that the architecture 100 may include different components, more components, less components, or the like. It should also be appreciated that some of the roles within architecture 100 may be combined into a common component.

In the example of FIG. 1, catalog data may be uploaded during a first process and guided buying may be performed during a second process. Catalog data may be uploaded by the user device 102 via the network 112 and stored within the index 128. The catalog data may include a file, a spreadsheet, a document, or the like, which includes catalog records of products for sale. Each record may include a product description, and other data. Before the data is indexed, it may be normalized. The catalog data may be provided from the network 112 to the seller tool 116.

The catalog data may be transferred to the ML software 114 where it can be extracted, cleaned, transformed, validated, and normalized. For example, the ML software 114 may identify attribute values of a product within a catalog record, and identify predefined attribute names of the product type from the taxonomy 120 which includes a taxonomy or other hierarchical relationship of products and their attributes. The ML software 114 may include both an extraction pipeline and a normalization pipeline. The ML software 114 may identify and link attribute values that correspond to the predefined attribute name within an unstructured description or other text within the catalog record. In addition, the ML software 114 may normalize one or more of the identified attribute values. The normalized attribute values may be provided to the seller tool 116. The processes may be referred to as entity linking, also referred to as record linkage or entity resolution. The entity linking may include aligning a textual mention of a named-entity to an appropriate entry in a structured knowledge base (taxonomy 120), which may or may not contain the entity. In broader perspectives, the entity linking may include a task of information extraction and retrieval, where the processing of natural language text aims to produce structured knowledge, suitable for storage in a database for later retrieval, smart filtering, semantic search, and content relevance based ranking.

The ML software 114 may identify boundaries of named entities, such as 'iPhone 7' instead of 'iPhone' or '7' separately, in product description and classify the tokens into a predefined set of named entities, including but not limited to color, dimension, memory type, and the like. The ML software 114 may group two or more named entities and other anaphoras in the product description that refer to the same real world entity, such as 'hp laptop' and 'Hewlett-Packard laptop' which might refer to the same entity (i.e., 'Manufacturer brand'). Given two named entities, the ML software 114 may identify relationships between the entities expressed in the text, such as 'Canon 6513B004 (CLI-251) ChromaLife100+ Ink cartridges which are compatible for use in Canon Pixma iP7220, iP8720, IX6820, MG5420, MG5520, MG5620, MG6320, MG7120 and MX922', and are identified as two different entities "Printer Cartridges" and "Printer Model" with the "compatibility relationship". The ML software 114 may utilize a word-level embedding representation that encode both syntactic and semantic text information, leverage the neural network architecture of sequence labeling.

In a neural network architecture, bi-directional long short-term memory (Bi-LSTM) is used to model context information of each word token, and on top of Bi-LSTM, the sequential CRF may be trained to jointly decode labels for the whole sentence. The end-to-end model in ML software 114 automatically performs linguistic entity linking, without requiring task-specific resources, hand-crafted feature engineering, or special rule-based text preprocessing such as word spelling correction and consistent capitalization pattern requirement. The ML software 114 is designed and made applicable to a wide range of attribute value extraction, attribute value-to-name linking, and attribute value and name normalization tasks in a heterogeneous product catalog.

In some embodiments, the normalized attribute content of the catalog record may be stored in the index 128. As another example, price information may be uploaded separately from the initial catalog data. For example, user device 102 may upload a pricing file via the network 112 to the seller tool 116. The seller tool 116 may combine the pricing file with the normalized catalog record content, and store the normalized content with the pricing information within the index 128. Accordingly, the normalized catalog content is now available for searching via the online marketplace 118.

Master content including the normalized catalog data and the pricing information may be stored in the database 124. For example, the database 124 may comprise any query-responsive data source or sources that are or become known, including but not limited to a structured-query language (SQL) relational database management system. The database 124 may include a relational database, a multi-dimensional database, an Extensible Markup Language (XML) document, or any other data storage system storing structured and/or unstructured data. The data stored within the database 124 may be distributed among several relational databases, dimensional databases, and/or other data sources. Embodiments are not limited to any number or types of data sources. In some embodiments, the data may include files having one or more of conventional tabular data, row-based data, column-based data, object-based data, and the like. Moreover, the data may be indexed and/or selectively replicated in the index 128 to allow fast searching and retrieval thereof. The database 124 may support multi-tenancy to separately support multiple unrelated clients by providing multiple logical database systems which are programmatically isolated from one another. Furthermore, the database 124 may support colocation of groups of client data.

Although not shown in FIG. 1, a buyer may submit a search query (e.g., one or more terms, descriptions, ID numbers, etc.) from a buyer system to guided buying application 110. Here, the guided buying application 110 may be accessed by the buyer's device via a network such as Internet, etc. The search query may be issued to the spotbuy service 122. In some embodiments, the search query may be issued to the buying service 130 for a private search. After the search query is issued to the spotbuy service 122, the spotbuy service 122 sends the query to the online marketplace 118 implemented via the seller tool 116. In response, the online marketplace 118 may send the search query to the taxonomy 120 which can normalize or otherwise expand the search query input. For example, the taxonomy 120 may expand the search query based on a category of the search query, an attribute included in the search query, a keyword, or the like. The taxonomy 120 may normalize the search query input such that it matches the normalization of the attribute values of catalog data. In this example, both the product data is being normalized and the user search query is being normalized to provide better and more efficient search results.

The normalized search query input may be provided from the seller tool 116 to the index 128. The index may be used to generate and return search results for the normalized search query input based on normalized catalog data stored in the index 128. The search results may include a listing of products as well as their catalog data that are identified by the search engine based on normalized attribute values within the catalog data. The search results may be returned to the user via the spotbuy service 122 and the guided buying application 110. The search results may be displayed on a user interface of the buyer's device which is accessing the guided buying application.

In the example of FIG. 1, both the catalog data uploaded by a seller during a first process is normalized and a search query input transmitted by a buyer during a second process is normalized. However, embodiments are not limited to both the catalog data and the search query input being normalized. As another example, only the catalog data may be normalized, or only the user search query input may be normalized.

Figure 2A:
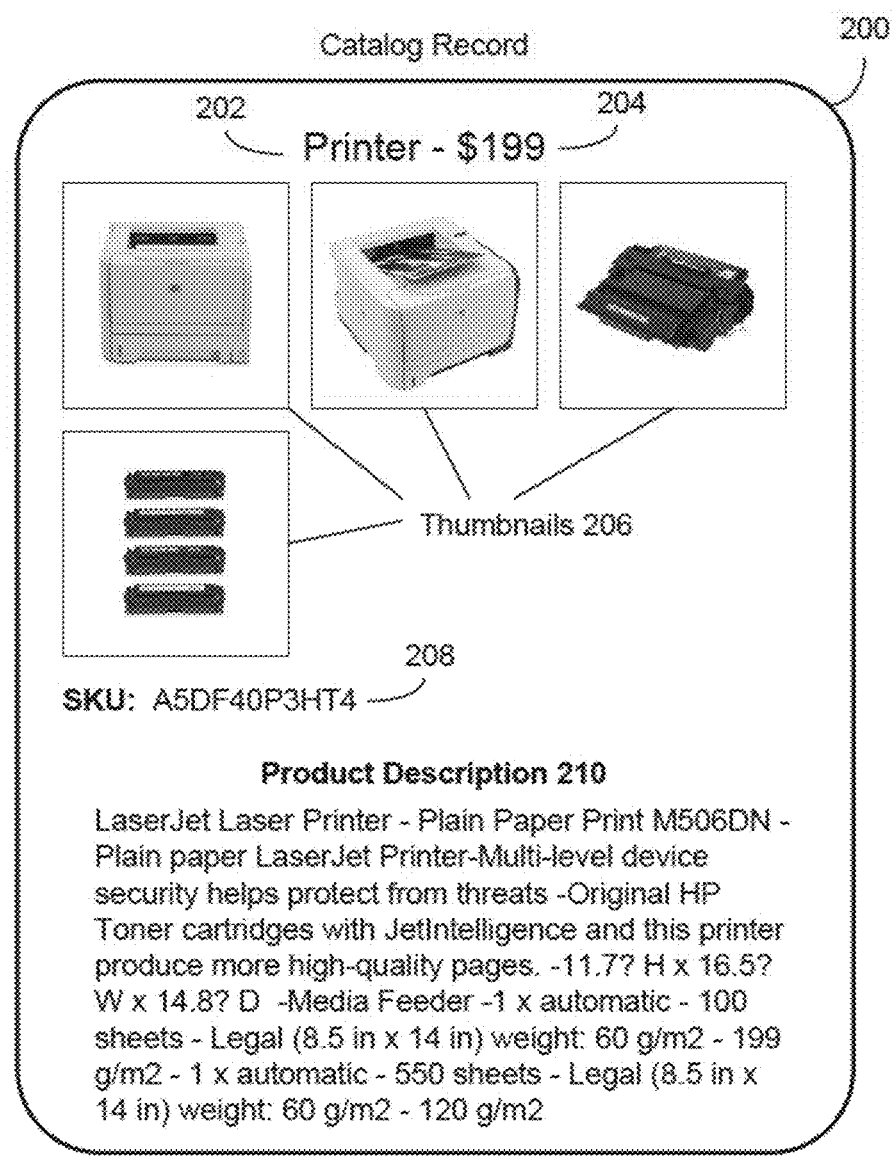
FIG. 2A is a diagram illustrating a catalog record of an object in accordance with an example embodiment.
Figure 2B:
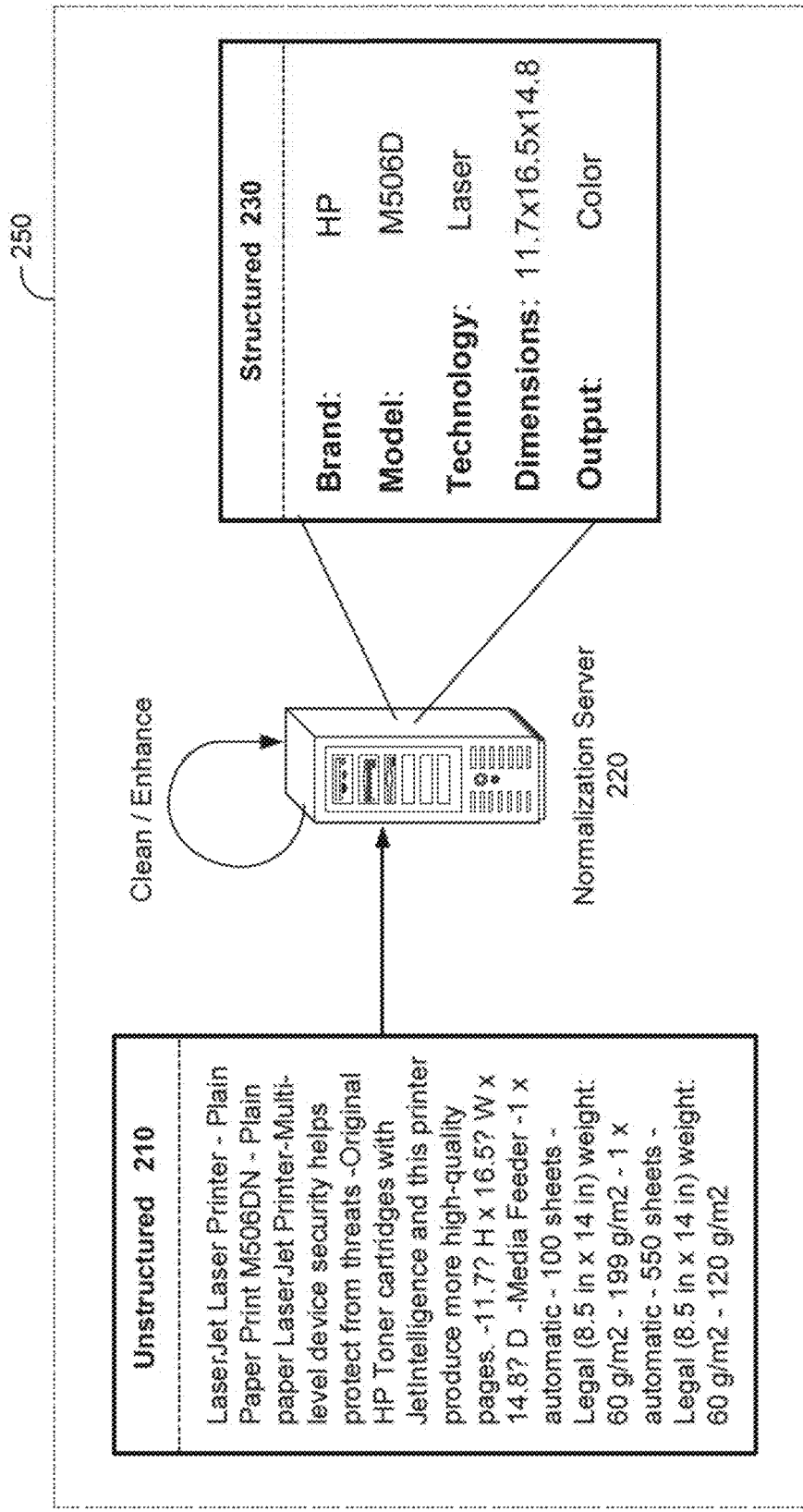
FIG. 2B is a diagram illustrating a process of normalizing unstructured data from the catalog record in FIG. 2A, in accordance with an example embodiment.

FIG. 2A illustrates an example of a catalog record 200 of an object in accordance with an example embodiment, and FIG. 2B illustrates a process 250 of normalizing unstructured data 210 from the catalog record 200 in FIG. 2A to generate a structured data 230, in accordance with an example embodiment. Referring to FIG. 2A, the catalog record 200 includes a plurality of components such as an object name 202, a price 204, a plurality of images 206, a product ID number 208, and a product description 210. The product description 210 may include unstructured text and/or structured text. In many situations, product descriptions are provided by a vendor or a supplier of the product. As a result, a product description of a common item, such as a printer, is going to be different when the description is from two different suppliers. The catalog record 200 in this example corresponds to a printer category or object type. The system herein may identify a category (object type) and query a taxonomy for predefined attributes of the object type.

According to various embodiments, within the product description 210 is textual data which may include alphanumeric characters, text, letters, words, numbers, sentences, phrases, strings, symbols, and other content. The product description 210 may describe attributes of the product or object that is being sold. For example, the product description 210 may describe internal components, external features, accessories, sizes, dimensions, colors, weight, compatibility, and the like. When the product description 210 is received by the system described herein, such as the architecture 100 shown in FIG. 1, the product description may include a string of characters in an unstructured format.

Figure 3:
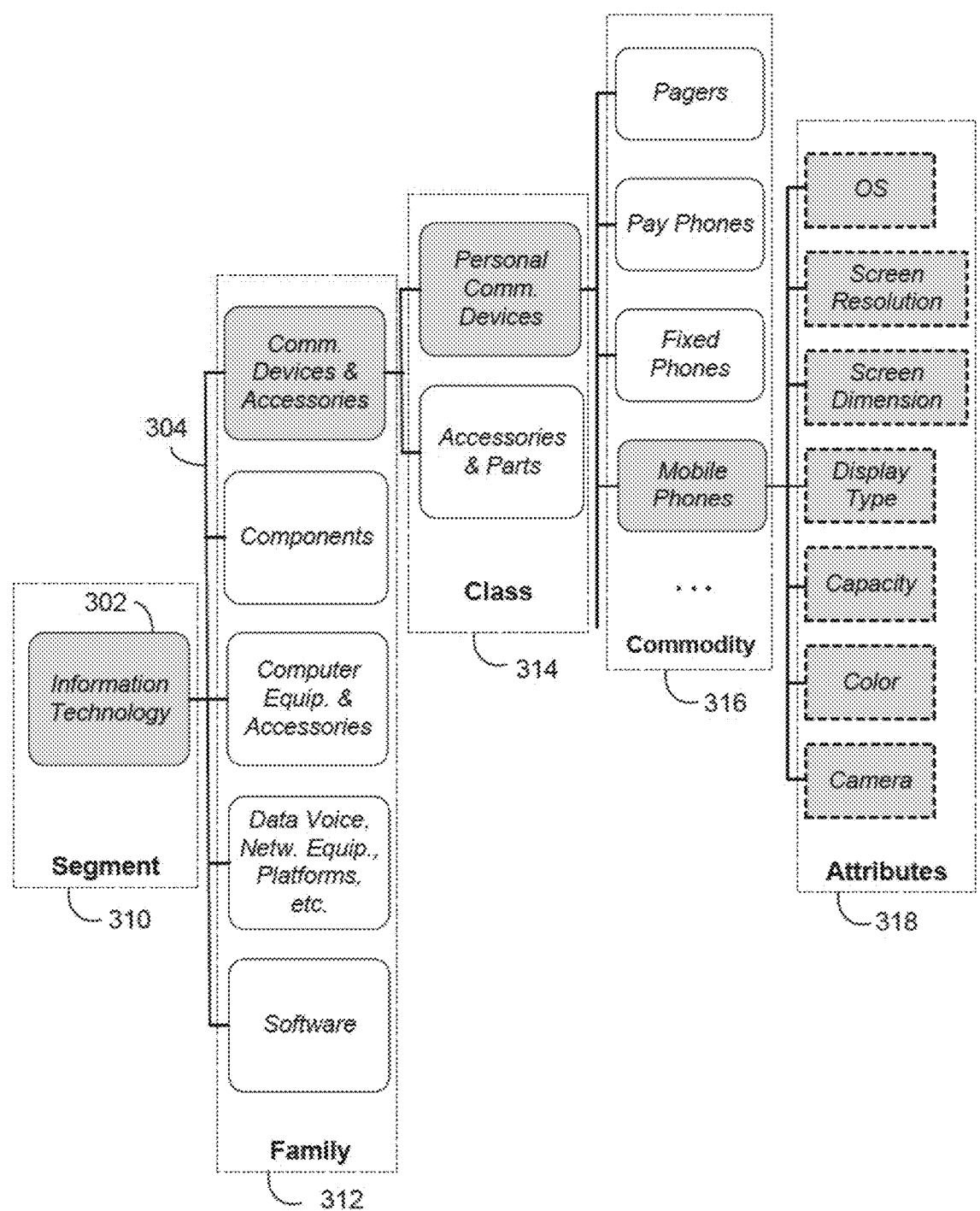
FIG. 3 is a diagram illustrating a taxonomy that identifies attributes of an object in accordance with example embodiment.

FIG. 2B illustrates a process 250 of converting the product description 210 shown in FIG. 2A into a structured format 230. According to various embodiments, one or more machine learning algorithms may identify various predefined attributes for the product based on a taxonomy (or ontology) of attributes which are hierarchically defined for an item. An example of the taxonomy is shown in FIG. 3. Each product may have its own unique set of attributes where some of the attributes are common across multiple types of products (e.g., brand name, color, model, etc.) while some attributes are product-specific such as display type (for a mobile device), printer technology (for a printer), and the like.

After the predefined attributes for the product have been identified, the process 250 may execute different types of machine learning algorithms with one or more algorithms looking for universal attribute values and one or more algorithms looking for product-specific attribute values. In the example of FIG. 2B, a normalization server 220 performs the machine learning process, but it may be performed by another device or system of devise. The normalization server 220 may identify raw values from the unstructured product description 210 which have values that are not normalized. In this example, the normalization server may identify a model as M506DN which is not an exact match for a normalization value. Instead, the normalization server may convert the model number to M506D (with the character 'N' removed) to enhance the ability of the product to be found during a search.

The normalization server 220 may search for raw attribute values from the unstructured data 210 for each of the predefined attributes identified by querying the taxonomy. Accordingly, the normalization server 220 can attempt to identify all possible values for a product based on the product description. In some cases, the product description may not include a value for an attribute. In this case, the normalization server 220 may ignore the attribute value. As another example, the normalization server 220 may imply or otherwise infer a value for the missing attribute value, when enough information is present in the product description. In this example, the description does not specifically say that the printer is an HP printer. However, description does mention that the printer accepts HP toner cartridges. In this case, the normalization server 220 may determine that the printer is an HP printer based on such a description.

The identified attribute values may be stored in a structured record 230 which can be used to represent the product within an index. Each catalog record may be formatted into a structured format such as the structured record 230 or other type of structure which has stored therein the attribute values while other non-attribute data from the unstructured description 210 is removed or excluded. In other words, the structured record 230 may include a clean description of attribute values without storing unnecessary data that is not identified as an attribute value. Furthermore, the structured record 230 may be stored in an index based on a category of the product.

FIG. 3 illustrates a taxonomy that identifies attributes of an object in accordance with example embodiment. For example, the taxonomy may be a taxonomy or ontology of products and services for use in e-commerce. One example of a taxonomy that may be used is the United Nations Standard Products and Services Code or UNSPSC, however embodiments are not limited to UNSPSC or to a taxonomy but may use other product and/or service related commodity coding schemes such as Common Procurement Vocabulary, Global Product Classification, Eclass, and the like. The taxonomy includes a hierarchical representation of products which may include goods and services.

The taxonomy may identify attributes (or values thereof) that are to be extracted for a product from a product description or other unstructured content of a catalog record. In the example of FIG. 3, nodes 302 identifying classifiers are connected to each other via links 304 thereby identifying a hierarchical relationship between the nodes 302. Here, a first tier or level of the hierarchy may include a segment 310. Each segment 310 may include one or more families 312. Meanwhile, each family 312 may include one or more classes 314, and each class 314 may include one or more commodities 316. In the UNSPSC, the commodity 316 is the lowest layer of the taxonomy. According to various embodiments, predefined attribute values may be assigned to commodities 316 within the taxonomy. Each commodity 316 may be assigned a unique set of predefined attributes where some attributes are universal and some are commodity-specific.

In the example of FIG. 3, the taxonomy shows a hierarchical classification of a mobile phone with the segment 310 being classified as information technology, the family 312 being classified as communication devices and accessories, the class 314 being classified as personal communication devices, and the commodity 316 being classified as a mobile phone. The taxonomy may be queried by a host server of the online marketplace or other search engine, and may return the attributes 318 of the mobile phone based on a traversal of the taxonomy. In this example, the attributes 318 for a mobile device include an operating system (OS), a screen resolution, a display type, a capacity or storage, a color of the mobile device, and a camera type embedded within the mobile device. These attributes 318 may be returned to the host server where machine learning algorithms may be executed to search for attribute values associated with the predefined attributes 318 for the mobile phone from a product description of a catalog record.

One of the difficulties in normalizing product data is the amount of product types. For example, over 50,000 commodities are listed in the UNSPSC and the amount is constantly growing. The example embodiments have found a way to learn from and normalize descriptions of these commodities by identifying high-quality attributes that are associated with each commodity (or product). These attributes are not an exhaustive list of attributes for a product but may include a subset of attributes that have been identified by machine learning algorithms as good normalizers of the catalog data.

Figures 1, 4A:
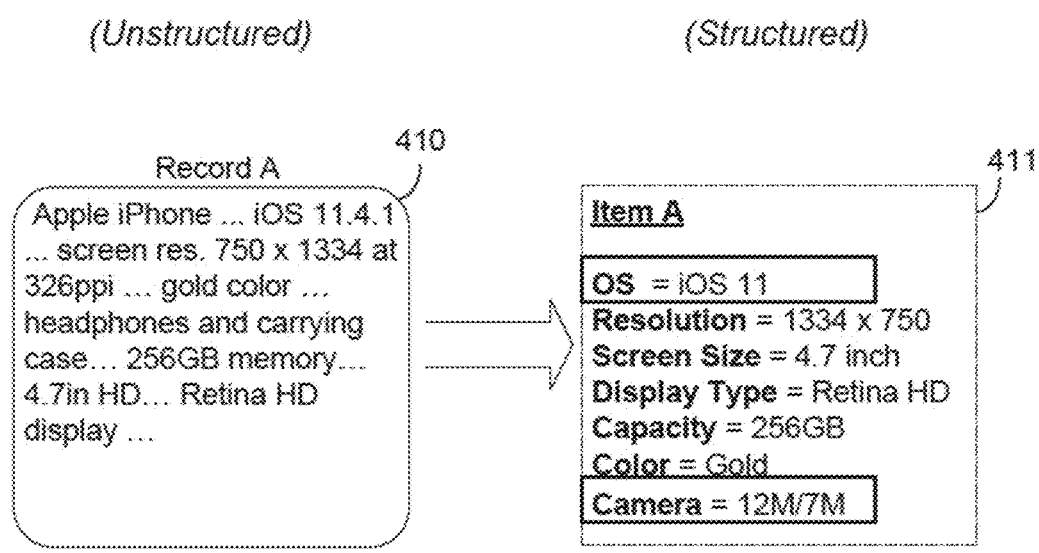
Figures 2, 4A:
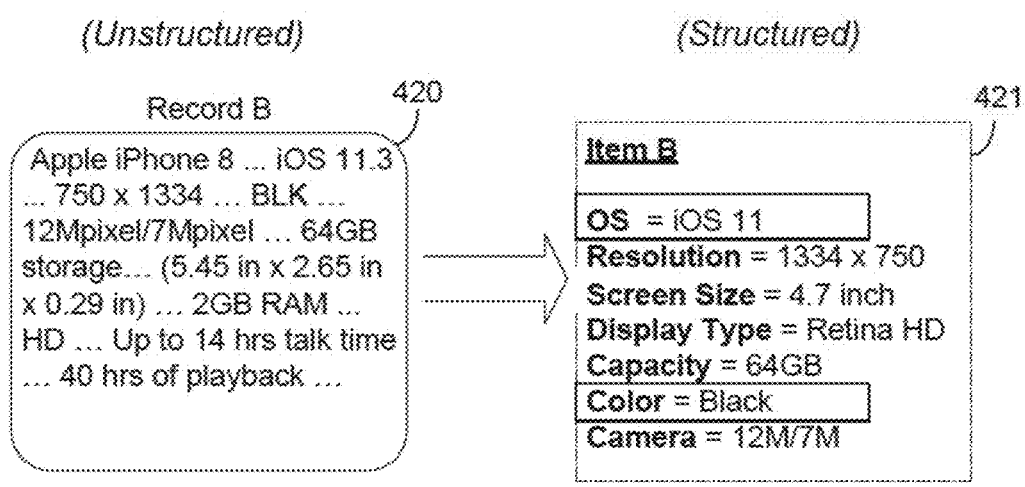
Figures 3, 4A:
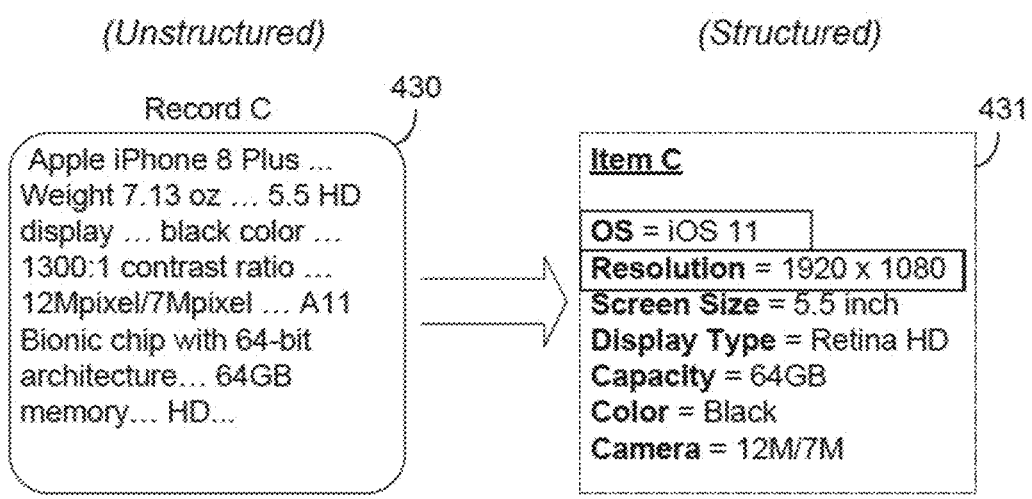
Figure 4B:
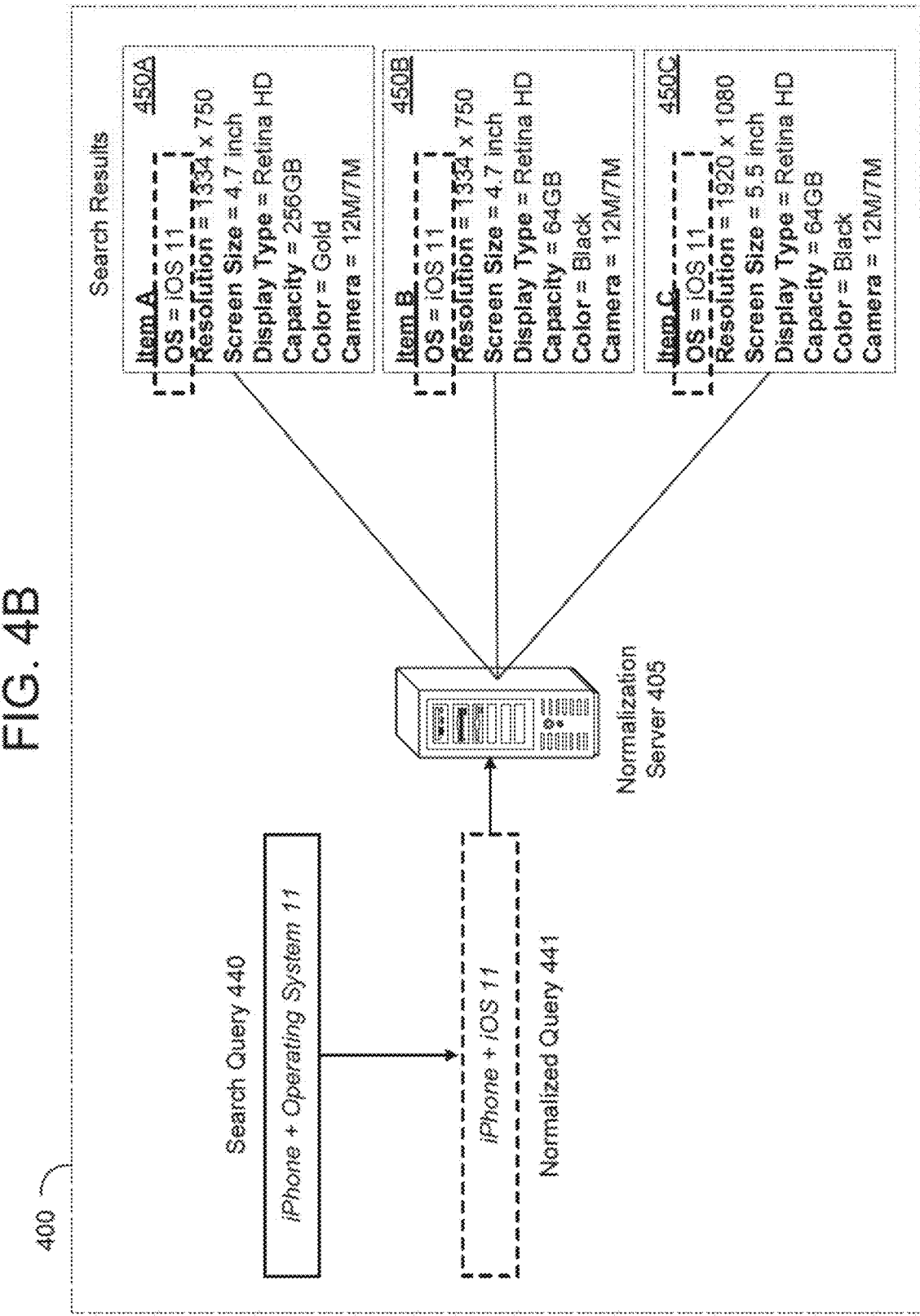
FIG. 4B is a diagram illustrating a process of normalizing a search query input and performing a search based on the catalog records of FIGS. 4A-1, 4A-2, and 4A-3, in accordance with an example embodiment.

FIGS. 4A-1, 4A-2, and 4A-3 illustrate a process of normalizing and indexing a plurality of catalog records, in accordance with an example embodiment, and FIG. 4B illustrates a process 400B of normalizing a search query input and performing a search based on the catalog records of FIGS. 4A-1, 4A-2, and 4A-3, in accordance with an example embodiment. Referring to FIGS. 4A-1, 4A-2, 4A-3, and 4B, a normalization server 405 may perform a normalization of catalog records 410, 420, and 430 into structured data records 411, 421, and 431, and may perform a normalization of a search query input 440 into a normalized search query input 441. Furthermore, the normalization server 405 may generate search results 450A, 450B, and 450C based on the normalized search query input 441 being matched with normalized attributes of the structured data records 411, 421, and 431.

Referring to FIGS. 4A-1, 4A-2, and 4A-3, the normalization server 405 may identify a set of predefined attributes for a product type and execute machine learning algorithms to identify values for the predefined attributes from unstructured data. In this example, the category of product is mobile phone which corresponds to the predefined attributes shown in the taxonomy of the example of FIG. 3. Each of the catalog records 410, 420, and 430 include a description of the same type of mobile phone, with each record including various differing attribute values from the others.

Record 410 includes a description of a mobile phone with an operating system value of "iOS 11.4.1." The normalization server 405 may convert this value into "iOS 11" which is a normalized value for the attribute. The normalized value may be determined by a machine learning algorithm executing on the normalization server 405. In doing so, the normalization server 405 improves the chances of the record 410 being identified from a search query by generalizing the operating system value. Furthermore, the normalization server 405 infers a camera attribute value of 12M/7M based on the screen size and display identified from the record 410. After identifying the attribute values, and normalizing two of the attribute values, the normalization server 405 may create a structured record 411 for the product described by record 410.

Record 420 also includes a description of a mobile phone with an operating system value of "iOS 11.3." The normalization server 405 may convert this value into "iOS 11" which is a normalized value for the attribute. Furthermore, the normalization server 405 may normalize a value of the screen size from "5.45 in×2.65 in×0.29 in" to "4.7 inch." This example also illustrates a second layer of normalization which may be performed (i.e., value normalization). In this example, the color BLK is identified from the record 420. Here, the normalization server 405 may normalize the value of BLK into "black" which provides an additional layer of normalization. After identifying the attribute values, and normalizing three of the attribute values, the normalization server 405 may create a structured record 421 for the product described by record 420.

Record 430 also includes a description of a mobile phone without listing its operating system. Here, the normalization server 405 may infer that the operating system is "iOS 11" based on the product itself (i.e., "Apple iPhone 8.") Furthermore, the normalization server 405 may infer the value of screen resolution of "1920×1080" based on the contrast ratio. After identifying the attribute values, and normalizing two of the attribute values, the normalization server 405 may create a structured record 430 for the product described by record 430. Here, the structured records 411, 421, and 431 may be stored in an index (e.g., index 128 in FIG. 1, etc.) where they can be searched together in an organized manner.

FIG. 4B illustrates the process 400B of a search query 440 being input for a mobile device with an operating system 11. In this example, the normalization server 405 may normalize the search query input 440 to modify one or more terms of the search query input to generate a normalized query input 441. For example, the normalization server 405 may modify the term "operating system 11" into "iOS 11" based on one or more machine learning algorithms. Furthermore, the normalization server 405 may perform the search query based on the normalized search query input 441 to generate search results 450A, 450B, and 450C that satisfy the criteria of the normalized search query input 441. Here, the search results 450A, 450B, and 450C may be identified based on normalized attribute values of the search results matching the normalized search query input 441.

In the example of FIG. 4B, without normalization of the records 410, 420, and 430, none of the records and the search query input 440, the search would not have returned records 410, 420, and 430 as search results based on the search query input 440. However, in this example, each of the normalized and structured records 411, 421, and 431 are returned as search results 450A, 450B, and 450C because they have a normalized attribute value "iOS 11" that matches a normalized query input 441.

As will be appreciated, many types of normalization are possible with the example embodiments. The machine learning algorithms may continually learn as well, based on the catalog data that is normalized and added to the system. In other words, in addition to normalizing catalog records into normalized structured records, the machine learning algorithms may update and learn from the catalog records. Therefore, the system can continually learn as catalog data is added to the system.

Figure 5:
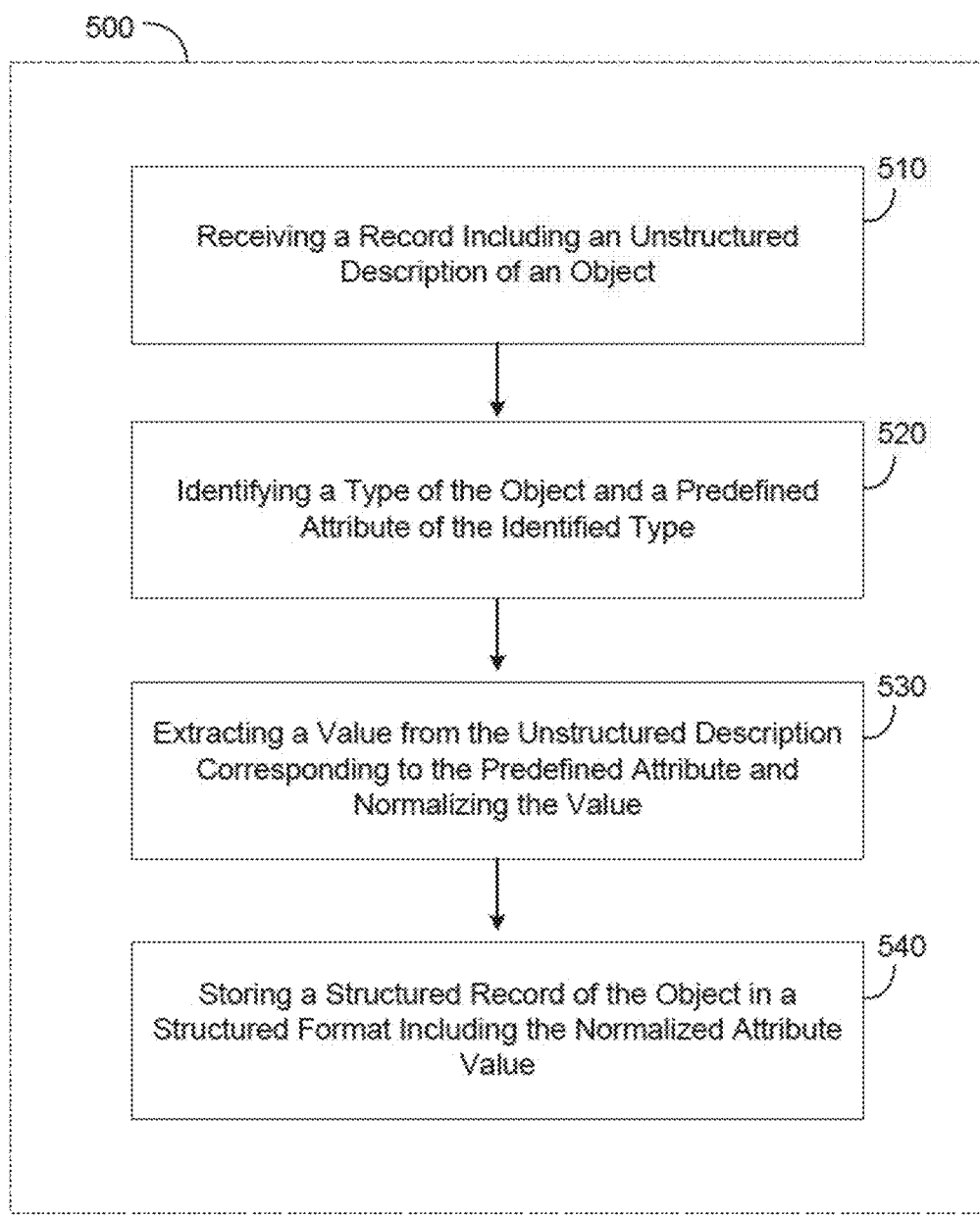
FIG. 5 is a diagram illustrating a method of normalizing unstructured data of a catalog record in accordance with an example embodiment.

FIG. 5 illustrates a method 500 of normalizing unstructured data of a catalog item in accordance with an example embodiment. As an example, the method 500 may be performed by a database node included within a distributed database system. As another example, the method 500 may be performed by a computing device such as a web server, a cloud platform, a user device, an on-premises server, and the like. In some examples, the method 500 may be performed by a plurality of devices in combination. Referring to FIG. 5, in 510, the method may include receiving a record comprising an unstructured description of an object. For example, the object may be an item such as a product, a hardware, a software, a unit, a part, a component, or the like.

In some embodiments, the record may include a catalog item that is included in an electronic catalog and the object may be a product that is listed for sale within the catalog. The record may be included in a file, a disk, a storage medium, or the like. The unstructured description may include a product description or other string of alphanumeric text which includes words, descriptions, phrases, numbers, and/or the like. Each word or piece of description may be unstructured and supplier-specific. As another example, the unstructured description may be partially structured such as sentences, parenthesis, field value, and/or the like. However, the data within the description may be un-normalized in that it does not have any specific format or structure.

In 520, the method may include identifying a type of the object from among a plurality of object types and identifying a predefined attribute of the identified type of object. For example, the identifying may include identifying a product for sale within the catalog item. As another example, the identifying may include identify an item such as a part, a component, or the like, which is listed within a catalog or other document. Each type of object may include a respective group of attributes where some of the attributes are universal or common among multiple object types and some attributes are unique to the specific type of object. The identifying may be performed by executing one or more machine learning algorithms on the unstructured data which are trained based on historical unstructured descriptions.

In some embodiments, the object types may be defined within a hierarchical taxonomy where relationships of object types are identified. The taxonomy may also provide a listing of predefined attributes that are associated with a type of object. In this example, the identifying may include querying a database storing the taxonomy or hierarchical relationships of object attributes based on the identified type of the object. The taxonomy may return a list of predefined attributes that the machine algorithms search for within the unstructured description.

In 530, the method may include selecting a predefined attribute from among the predefined attributes, extracting a value from the unstructured description corresponding to the predefined attribute and modifying the extracted value to generate a normalized attribute value. For example, the extracting and the modifying may include selecting one or more words from the unstructured description and converting the one or more words into one or more normalized words for the predefined attribute. In some embodiments, each of the predefined attributes may be extracted and searched for individually within the unstructured description. Not all of the values of the predefined attributes may need to be normalized because they may already be in the normalized format.

In 540, the method may include generating a structured record including values of the predefined attributes for the object (including the at least one normalized attribute value) and storing the structured record of the object in a structured format. For example, the structured format may include a plurality of values of a plurality of attributes of the object from the unstructured description including the normalized attribute value for the predefined attribute of the object. In some embodiments, the structured format may include a list of fields storing the plurality of values corresponding to the plurality of attributes of the object. In some embodiments, the storing the structured record may include storing the plurality of values of the object in a search index comprising information about a plurality of searchable objects.

The object types may include both predefined universal attributes and non-universal attributes or object-specific attributes. For example, the universal attributes may be common across more than one of the object types. Examples of universal attributes include brand name, color, product name, etc., which are common attributes of all different object types. The object-specific attributes may include attributes that are particular to an object type or a few object types which may be identified by the hierarchy in the taxonomy. Examples of object-specific attributes include screen size, operating system, display type, printer type, and the like. In some embodiments, although not shown in FIG. 5, the method may further include executing a query on a plurality of structured object records which have been normalized. The search query may identify the structured record of the object as a search result of the query based on the normalized attribute value for the predefined attribute of the object.

Figure 6:
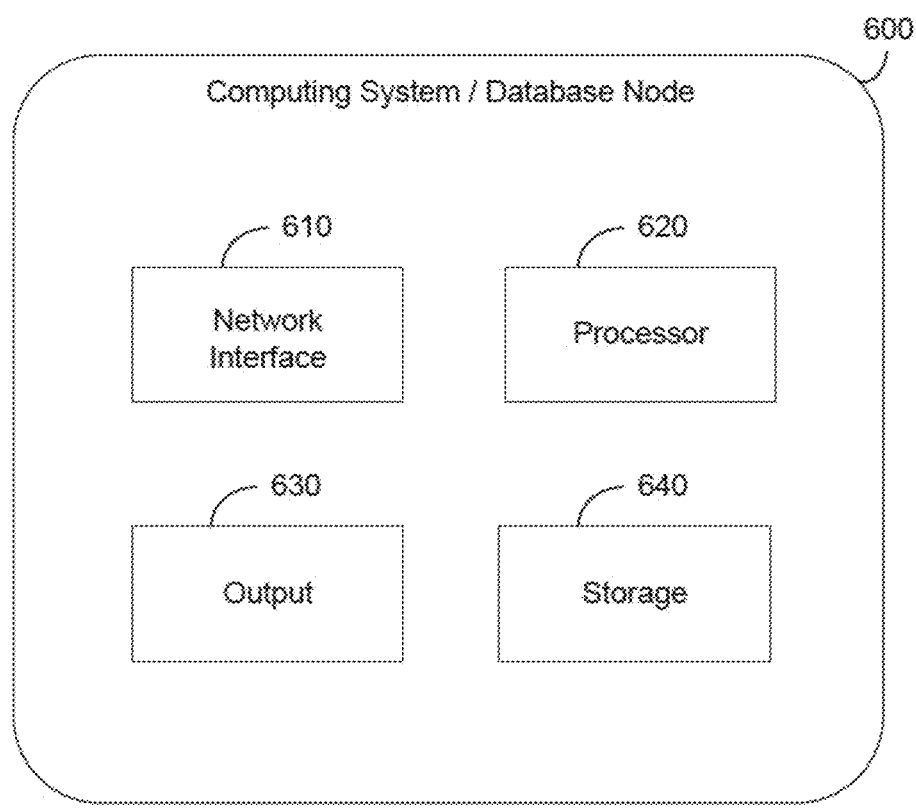
FIG. 6 is a diagram illustrating a computing system in accordance with an example embodiment.

FIG. 6 illustrates a computing system 600, in accordance with an example embodiment. For example, the computing system 600 may be a database node, a server, a cloud platform, a user device, or the like. In some embodiments, the computing system 600 may be distributed across multiple devices. Referring to FIG. 6, the computing system 600 includes a network interface 610, a processor 620, an output 630, and a storage device 640 such as an in-memory. Although not shown in FIG. 6, the computing system 600 may also include or be electronically connected to other components such as a display, an input unit, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 1000, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices.

The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 600 shown in FIG. 6. According to various embodiments, the storage 640 may store database files and may have a partitioning scheme as shown or described in the examples herein. The storage may include a data store having a plurality of tables, partitions and sub-partitions.

Referring to FIG. 6, the network interface 610 may receive a record comprising an unstructured description of an object. For example, the record may be a category item of a product, a service, or the like, which may be referred to herein as an object. According to various embodiments, the processor 620 may identify a type of the object (e.g., a type of product, etc.) from among a plurality of object types and identify a predefined attribute of the identified type of object. The predefined attribute or attributes may be identified by querying a taxonomy or other commodity based classification system which has been enhanced with product attributes. The processor 620 may extract a value from the unstructured description corresponding to the predefined attribute and modify the extracted value to generate a normalized attribute value. Furthermore, the processor 620 may generate and store a structured record of the object in a structured format comprising a plurality of values of a plurality of attributes of the object from the unstructured description including the normalized attribute value for the predefined attribute of the object.

In some embodiments, the processor 620 may identify the predefined attribute via a query of a database that stores hierarchical relationships of object attributes based on the identified type of the object. In some embodiments, the processor 620 may select one or more words from the unstructured description and convert the one or more words into one or more normalized words for the predefined attribute. In some embodiments, the structured format may include a list of fields that store the plurality of values corresponding to the plurality of attributes of the object. In some embodiments, the processor 620 may store the plurality of values of the object in a search index that includes information about a plurality of searchable objects. In some embodiments, at least two object types from among the plurality of object types may share the predefined attribute in common. In some embodiments, the predefined attribute may be unique to the identified object type from among other object types among the plurality. In some embodiments, the processor 620 may further execute a query which identifies the structured record of the object as a search result of the query based on the normalized attribute value for the predefined attribute of the object.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

The invention claimed is:

1. A computing system comprising:
a storage device configured to store a plurality of electronic catalogs from a plurality of different vendors, respectively; and
a processor configured to
identify values corresponding to attributes of objects from unstructured descriptions of the objects stored in the plurality of electronic catalogs, wherein the identifying comprises executing a machine learning model that is trained to identify and extract the values,
convert the unstructured descriptions of the objects into structured records of the objects based on the identified values,
normalize identified values within one or more of the structured records of the objects based on a predetermined format to generate a normalized structured records for the objects and store the normalized structured records of the objects within an index,
receive a query from a software application, and
normalize a term within the query and execute the query with the normalized term on the normalized structured records of the objects stored in the index to identify a normalized structured record of an object that matches the normalized term in the query.

2. The computing system of claim 1, wherein the processor is further configured to execute, via a search engine, the query on the normalized values in the index to generate search results, and return the search results via the search engine.

3. The computing system of claim 2, wherein the processor is configured to normalize an input value corresponding to one or more of an object type, a color type, and a name of the query prior to executing the query on the index.

4. The computing system of claim 1, wherein the processor is further configured to query a taxonomy associated with the index to identify the normalized term for the query.

5. The computing system of claim 1, wherein the machine learning model is configured to identify a generic attribute comprises at least one of an object name, an object color, and an object size, and add the generic attribute to a corresponding structured record.

6. The computing system of claim 5, wherein the processor is configured to identify a value of a second object that corresponds to the generic attribute, normalize the identified value of the second object to match the normalized value of the object, and store the normalized value of the second object in the index.

7. The computing system of claim 1, wherein the index comprises a predefined structure, and the processor is configured to remove data from an unstructured description of an object from an electronic catalog and structure remaining data from the description of the object in a format that matches the predefined structure of the index.

8. The computing system of claim 1, wherein the processor is configured to modify a value of a generic attribute of an object via execution of a machine learning algorithm which determines normalized values for raw attribute values.

9. A method comprising:
storing a plurality of electronic catalogs from a plurality of different vendors, respectively, via a storage device;
identifying values corresponding to attributes of objects from unstructured descriptions of the objects stored in the plurality of electronic catalogs, wherein the identifying comprises executing a machine learning model that is trained to identify and extract the values;
converting the unstructured descriptions of the objects into structured records of the objects based on the identified values;
normalizing identified values within one or more of the structured records of the objects based on a predetermined format to generate normalized structured records for the objects and store the normalized structured records of the objects within an index;
receiving a query from a software application; and
normalizing a term within the query and executing the query with the normalized term on the normalized structured records of the objects stored in the index to identify a normalized structured record of an object that matches the normalized term in the query.

10. The method of claim 9, wherein the method further comprises executing, via a search engine, the query on the normalized values in the index to generate search results, and returning the search results via the search engine.

11. The method of claim 10, wherein the method further comprises normalizing an input value corresponding to one or more of an object type, a color type, and a name of the search query prior to executing the query on the index.

12. The method of claim 9, wherein the receiving comprises querying a taxonomy associated with the index to identify the normalized term for the query.

13. The method of claim 9, wherein the machine learning model is configured to identify a generic attribute comprises at least one of an object name, an object color, and an object size, and add the generic attribute to a corresponding structured record.

14. The method of claim 13, wherein the normalizing further comprises identifying a value of a second object that corresponds to the generic attribute, normalizing the identified value of the second object to match the normalized value of the object, and storing the normalized value of the second object in the index.

15. The method of claim 9, wherein the index comprises a predefined structure, and the converting comprises removing data from an unstructured description of an object from an electronic catalog and structuring remaining data from the description of the object in a format that matches the predefined structure of the index.

16. The method of claim 9, wherein the method further comprises modifying a value of a generic attribute of an object to generate the normalized value is performed via execution of a machine learning algorithm which determines normalized values for raw attribute values.

17. A non-transitory computer-readable medium comprising instructions which when executed by a processor cause a computer to perform a method comprising:
storing a plurality of electronic catalogs from a plurality of different vendors, respectively, via a storage device;

identifying values corresponding to attributes of objects from unstructured descriptions of the objects stored in the plurality of electronic catalogs, wherein the identifying comprises executing a machine learning model that is trained to identify and extract the values;

normalizing identified values within one or more of the structured records of the objects based on a predetermined format to generate normalized structured records for the objects and store the normalized structured records of the objects within an index;

receiving a query from a software application; and normalizing a term within the query and executing the query with the normalized term on the normalized structured records of the object stored in the index to identify a normalized structured record of an object that matches the normalized term in the query.

18. The non-transitory computer-readable medium of claim 17, wherein the method further comprises executing, via a search engine, the query on the normalized values in the index to generate search results, and returning the search results via the search engine.

19. The non-transitory computer-readable medium of claim 18, wherein the method further comprises normalizing an input value corresponding to one or more of an object type, a color type, and a name of the query prior to executing the query on the index.

20. The non-transitory computer-readable medium of claim 17, wherein the machine learning model is configured to identify a generic attribute that comprises at least one of an object name, an object color, and an object size, and add the generic attribute to a corresponding structured record of an object.

* * * * *